Figure 1:
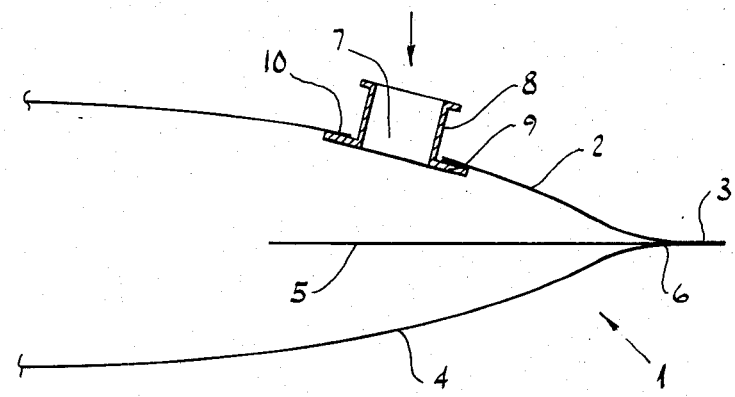

United States Patent [19]

Mellett

[11] 4,257,535
[45] Mar. 24, 1981

[54] CONTAINER FOR LIQUID HAVING A HEAT SEALABLE COLLAR FOR FILLING THE CONTAINER AND RECEIVING A DISPENSING MECHANISM

[75] Inventor: Lee T. Mellett, Glen Waverley, Australia

[73] Assignee: Wrightcel, Ltd., Auburn, Australia

[21] Appl. No.: 41,731

[22] Filed: May 23, 1979

[30] Foreign Application Priority Data

May 30, 1978 [AU] Australia ............................. PD4550

[51] Int. Cl.³ .............................................. B67B 7/24
[52] U.S. Cl. ........................................ 222/92; 53/479;
128/DIG. 24; 141/18; 150/8; 222/83; 229/62
[58] Field of Search ..................... 222/83, 105, 215, 92,
222/183; 229/62, 62.5, 483 B; 206/632; 150/8;
128/214 D, 227, 272, DIG. 24; 53/412, 479;
141/2, 18

[56] References Cited

U.S. PATENT DOCUMENTS

| 3,089,636 | 5/1963 | Swarte ................................. 229/62.5 |
| 3,439,869 | 4/1969 | Schrum et al. ................... 229/62.5 X |
| 3,642,047 | 2/1972 | Waage ........................................ 150/8 |
| 4,076,147 | 2/1978 | Schmit ............................. 222/183 X |

FOREIGN PATENT DOCUMENTS 402978  5/1968 Australia .
20383 10/1969 Australia .

Primary Examiner—David A. Scherbel
Assistant Examiner—Fred A. Silverberg
Attorney, Agent, or Firm—Irons and Sears

[57] ABSTRACT

A system for a flexible container for liquids in which a socket is fixed to one wall and the container is filled through this socket. A flap being heat sealable on one surface is attached to one wall of the container and this flap underlies the socket so that after filling the socket can be closed by the flap and the filled container is sealed for transportation. Subsequently the socket can be fitted with a tap which breaks the flap seal and enables the contents of the flexible container to be dispensed.

2 Claims, 3 Drawing Figures

CONTAINER FOR LIQUID HAVING A HEAT SEALABLE COLLAR FOR FILLING THE CONTAINER AND RECEIVING A DISPENSING MECHANISM

The present invention relates to bulk containers of the type having a flexible bag housed within an outer, relatively rigid box-like structure. More particularly, though not exclusively, the invention deals with bulk containers for wines and like liquids, which liquids are normally susceptible to deterioration through oxidation. Bulk wine containers are commonly referred to as wine casks, and recent years have seen a large influx into the market-place of such casks.

Whilst there has been a widespread acceptance of wine casks, there are still problems of oxidation to contend with during storage and before consumption.

One form of wine cask, for example, embodying a dispensing tap affixed to the flexible bag and extending through a wall of the outer box, suffers from air entering the bag via the tap despite the fact that the tap and bag are supposedly in air-tight relationship. The bag is filled with wine via the tap or a collar to which the tap is later affixed.

Another form of wine cask affords an air-impermeable, rupturable diaphragm at the dispensing point, with a tap which can be coupled to the bag in such manner as to rupture the diaphragm when the wine is to be consumed. Air is thus not able to enter the bag at the dispensing point until the diaphragm has been ruptured. The inclusion of a diaphragm means, however, that the bag must be filled other than through the tap hole—in fact, via the top of the bag which must be left open until full. Filling in this manner is less than satisfactory because a good deal of air enters the top of the bag along with the wine, not to mention dust and other impurities. A wine cask of this type is described in Australian Pat. Nos. 402,978 and 435,591.

The present invention seeks to provide an advance over and above the aforementioned wine casks, in terms of improved storage characteristics. The invention of course has application in other areas than wine, as previously indicated.

A further aspect of the present invention is to provide a simple labour saving method of assembling the container and taps.

Accordingly, one aspect of the invention makes provision for a bulk container of the type having a flexible container housed within an outer, relatively rigid, box-like structure; said flexible container having collar means affixed thereto and extending through a wall of the outer box, the collar means being capable of accommodating dispensing means; said flexible container further having an internal flap in juxtaposition with said collar means, said flap comprising a first heat-sealable surface and a second non-heat-sealable surface, the first and second surfaces facing towards and away from the dispensing means, respectively; the arrangement being such that said flexible container is capable of being filled through the collar means, and when the bag is full heat may be applied to the bag in the region of the flap so that said first surface of the flap becomes heat sealed to the collar means, thereby providing an air-impermeable rupturable diaphragm which can be ruptured on accommodation of the dispensing means within said collar means.

A further aspect of the invention provides a flexible bag comprising the aforementioned collar means and internal flap.

A problem in assembling the bulk container and dispensers as disclosed in Australian Pat. Nos. 402,978 and 435,591 is that in forming the tap socket on the wall of the container one component, the retaining ring, must be inserted inside the container and clamped over the surface of the external socket member to provide the frangible diaphragm (a portion of the container wall) within the socket. The operation of fitting the retaining ring to the socket is accomplished manually. p In the present invention the socket is simply glued or sealed to a wall of the flexible container and a hole formed in the wall of the container, which operation can be carried out automatically by machinery with none of the difficulties associated with inserting a retaining ring inside a flexible container and then locating this ring onto a socket outside of the container while retaining a portion of the container wall between the ring and socket.

Generally, the flexible bag when empty assumes a substantially rectangular configuration, one half being heat sealed to the other about the periphery. Preferably, the fixed end of the flap is sandwiched between a heat-sealed, peripheral portion of the bag.

The flap may be a laminate of polyethylene and polyvinylidene chloride (pvdc) and nylon, the former being heat-sealable but not so the latter.

Figure 2:
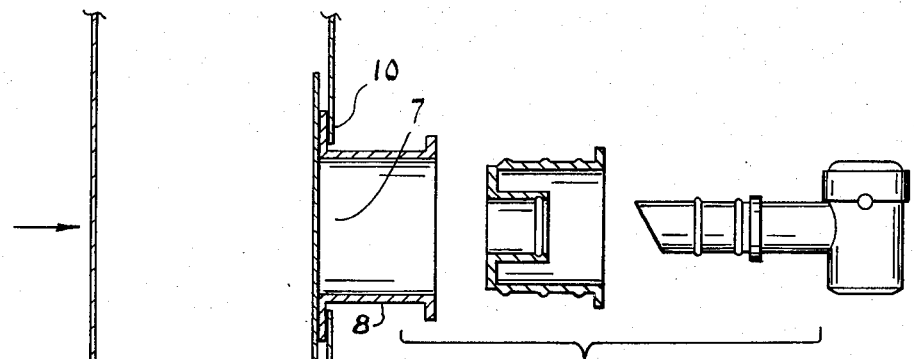
Figure 3:
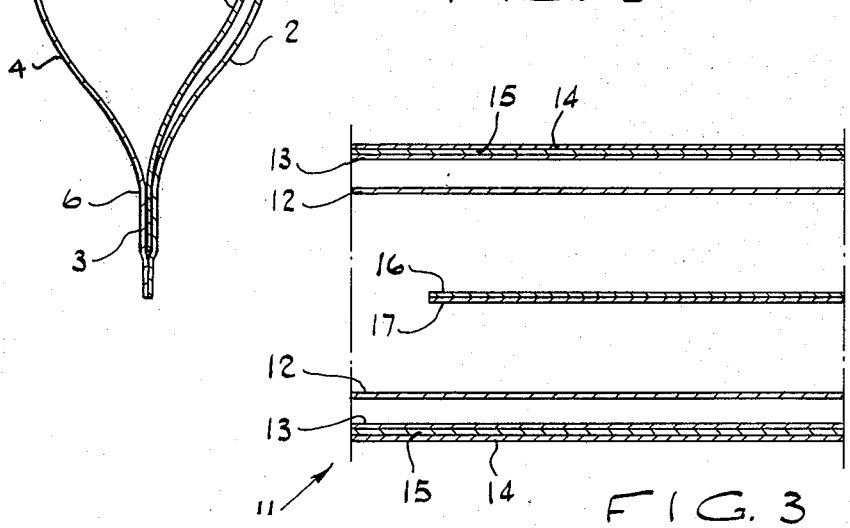

A preferred embodiment of the invention will now be described, by way of example only, with reference to the accompanying drawings in which FIG. 1 illustrates a part of a flexible bag in accordance with the invention, during the course of filling;

FIG. 2 illustrates the same part, after filling, and sealing of the flap in association with a dispensing tap, and FIG. 3 illustrates, in enlarged form, the various walls and flap constructions of the flexible bag shown in FIG. 1.

Referring to FIG. 1, the bag—generally designated as 1—comprises a wall 2 heat sealed at the periphery 3 to a lower wall 4. An internal flap 5 has its fixed end 6 sandwiched (and also heat sealed) between the two halves 2, 4 at the periphery 3. The flap 5 extends across and beyond an opening 7 in the flexible container wall 2 into which fits a collar 8. The flange 9 of collar 8 is heat sealed to the periphery 10 of the opening. The flap 5 does not impede filling of the bag. As mentioned above the collar 8 can easily be secured to wall 2 by ssuitable machinery.

The flap 5 need not be secured between the sides 2 and 4 as shown but may conveniently be bonded to the side wall 2 or even to one side of the collar 8.

Once the bag is full, a hot press (not shown) is brought to bear on the bag in the direction shown by the arrow in FIG. 2 with the result that the flap becomess sealed to the wall 2 and the collar 8 but not the wall 4 of the container.

In FIG. 2 in exploded view is shown the top construction comprising a tap socket which can be snugly fitted into socket 8 and a tap which includes a piercing pipe that ruptures the flap covering opening 7 when it is secured within the socket which in turn is secured in collar 8.

As shown in FIG. 3, each wall 2 and 4 comprises an outer laminate 11 and an inner but separate layer of polyethylene 12. The laminate 11 has an inner layer 13 of polyethylene, an outer layer 14 of nylon and an intermediate layer 15 of Saran. The flap, on the other hand, also in laminate form has a polyethylene layer 16 and a non-heat-sealable layer 17. It is not essential to this invention that the walls of the container be in laminate form but this is simply a preferred requirement.

As previously explained the construction of this invention means that after construction of the flexible container but prior to its being filled the interior of the container is vertically closed by the flaps covering opening 7 where as in the prior art one edge of the container was left unsealed to enable filling to occur. In the construction of this invention the flap does not obstruct filling of the flexible container but it does enable the interior to be kept dust free more effectively that prior art constructions. The presence of the flap and its ability to be heat sealed across the opening 7 also enables the contents to be sealed in an air tight leakage free manner until the insertion of the top.

I claim:
1. A flexible container, comprising:
  (a) a wall having a heat sealable opening:
  (b) a collar surrounding said heat sealable opening for filling said container before said opening is heat sealed and for receiving a dispensing means after said container is filled and said opening is heat sealed, and
  (c) a flap internally disposed within said container over said opening for providing a fluid seal over said opening after said container is filled through said collar, said flap including:
    (i) a first heat-sealable furface facing said opening for providing a fluid seal over said opening when heat is applied outside the container in the region of said flap; and,
    (ii) a second non-heat-sealable surface facing away from said opening for preventing said flap from being heat sealed to the interior of said container when heat is applied outside the container in the region of said flap to heat seal said flap over said opening.
2. The flexible container of claim 1 wherein said collar includes a flange which is sealingly engaged to said wall around said heat sealable opening prior to the filling of said container.

* * * * *